United States Patent
Zhu

(10) Patent No.: US 11,584,372 B2
(45) Date of Patent: Feb. 21, 2023

(54) METHOD TO DYNAMICALLY ADJUSTING SPEED CONTROL RATES OF AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 755 days.

(21) Appl. No.: 15/393,158

(22) Filed: Dec. 28, 2016

(65) Prior Publication Data

US 2018/0178791 A1    Jun. 28, 2018

(51) Int. Cl.
*B60W 30/14*      (2006.01)
*B60W 50/00*      (2006.01)

(52) U.S. Cl.
CPC ...... *B60W 30/143* (2013.01); *B60W 50/0097* (2013.01); *B60W 2520/10* (2013.01);
(Continued)

(58) Field of Classification Search
CPC ......... B60W 2520/10; B60W 2720/12; B60W 30/143; B60W 50/0097; B60W 2540/18; B60W 2720/106; B60W 30/146; B60W 30/18; B60W 30/18009; B60W 50/0098; B60W 60/00; B60W 60/001; B60W 60/0011; B60W 60/0013; G05D 1/0214; G05D 1/0225; G05D 1/0236; G05D 1/024; G05D 1/0242; G05D 1/0246; G05D 1/0255; G05D 1/0257; G05D 1/0259; G05D 1/0276; G05D 1/0278; G05D 1/028; G05D 2201/0213; G05B 2219/40465; G05B 2219/35212; G05B 2206/1504; B66B 2001/2475; B66B 2201/404

See application file for complete search history.

(56) References Cited

U.S. PATENT DOCUMENTS 2,447,730 A * 8/1948 Britton ................. B60W 10/06
4,924,397 A * 5/1990 Kurihara ............. B60K 31/047
                                                      180/179

(Continued)

FOREIGN PATENT DOCUMENTS

CN      1974297        6/2007
CN      102874250      1/2013

(Continued)

*Primary Examiner* — Russell Frejd
*Assistant Examiner* — Sara J Lewandroski
(74) *Attorney, Agent, or Firm* — Womble Bond Dickinson (US) LLP

(57) ABSTRACT

In one embodiment, a number of speed control rate candidates are determined for a speed control command of operating an autonomous vehicle. For each of the speed control rate candidates, a number of individual costs are calculated for the speed control rate candidate by applying a plurality of cost functions, each cost function corresponding to one of a plurality of cost categories. A total cost for the speed control rate candidate is determined based on the individual costs produced by the cost functions. One of the speed control rate candidates having a lowest total cost is selected as a target speed control rate. A speed control command is generated based on the selected speed control rate candidate to control a speed of the autonomous vehicle.

20 Claims, 9 Drawing Sheets

(52) U.S. Cl.
CPC ... *B60W 2540/18* (2013.01); *B60W 2720/106* (2013.01); *B60W 2720/12* (2013.01)

(56) References Cited

U.S. PATENT DOCUMENTS

| | | | |
|---|---|---|---|
| 2006/0217866 A1 | 9/2006 | Moebus | |
| 2007/0255477 A1* | 11/2007 | Okuda | B60L 58/14 |
| | | | 701/93 |
| 2010/0082208 A1* | 4/2010 | Asai | F16H 61/0213 |
| | | | 701/58 |
| 2011/0160978 A1* | 6/2011 | Yuzawa | B60W 10/06 |
| | | | 701/93 |
| 2013/0060413 A1* | 3/2013 | Lee | B62D 1/286 |
| | | | 701/23 |
| 2013/0304339 A1* | 11/2013 | Shattuck | F16D 48/06 |
| | | | 701/68 |
| 2014/0018994 A1* | 1/2014 | Panzarella | G05D 1/0212 |
| | | | 701/25 |
| 2015/0073620 A1* | 3/2015 | Matsumura | B60W 30/143 |
| | | | 701/1 |
| 2016/0035223 A1* | 2/2016 | Gutmann | B60W 30/18154 |
| | | | 340/907 |
| 2017/0253241 A1* | 9/2017 | Filev | G08G 1/096741 |

FOREIGN PATENT DOCUMENTS

| | | |
|---|---|---|
| CN | 103786724 | 5/2014 |
| CN | 106004876 | 10/2016 |
| DE | 102009030784 A1 | 2/2010 |
| DE | 102015211134 A1 | 12/2016 |
| JP | 05-113822 A | 5/1993 |
| JP | 2006-513903 A | 4/2006 |
| JP | 2015-230547 A | 12/2015 |

\* cited by examiner

| Throttle Rate Candidates (%) 501 | 30 | 60 | 80 | ... |
|---|---|---|---|---|
| Cost based on difference between next target and current throttle position (assuming difference = 50) 502 | 20 | 0 | 0 | ... |
| Cost based on difference between past target speed and actual/current speed (assuming difference = 5) 503 | 16.67 | 8.3 | 6.25 | ... |
| Cost based on vehicle speed (assuming current vehicle speed = 50 mph) 504 | 0 | 10 | 30 | ... |
| Cost based on throttle rate candidate itself 505 | 30 | 60 | 80 | ... |
| Cost based on current steering position (assuming current steering position is 40) 506 | 0 | 20 | 40 | ... |
| Total Cost 507 | 66.67 | 98.3 | 156.25 | ... |

FIG. 5

METHOD TO DYNAMICALLY ADJUSTING SPEED CONTROL RATES OF AUTONOMOUS VEHICLES

TECHNICAL FIELD

Embodiments of the present invention relate generally to operating autonomous vehicles. More particularly, embodiments of the invention relate to dynamically adjusting speed control rates of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, speed control is a critical step in autonomous driving. When seeking a speed control accuracy, one usually requires a high speed control (e.g., throttle, brake) changing rate. However, a high changing rate may be dangerous as it could be hard to predict vehicle's next movement and uncomfortable to passengers.

BRIEF DESCRIPTION OF THE DRAWINGS

Embodiments of the invention are illustrated by way of example and not limitation in the figures of the accompanying drawings in which like references indicate similar elements.

FIG. 5 is a data structure illustrating a process of determining speed control rates according to one embodiment of the invention.

DETAILED DESCRIPTION

Figure 1:
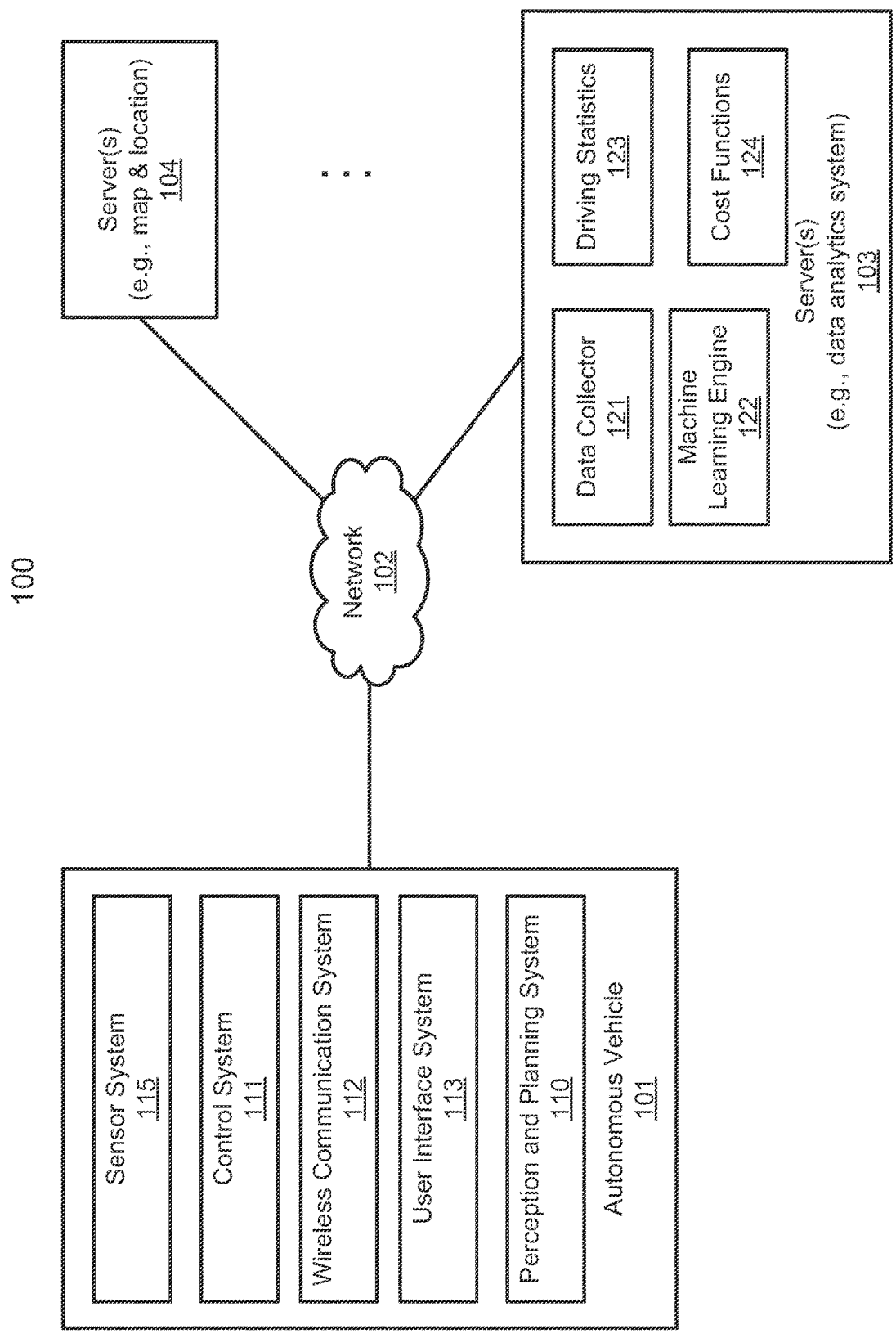
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a speed control rate determination system or predictive model is provided to determine or recommend a speed control rate (e.g., throttle rate or braking rate) based on the vehicle control information as planned at the point in time. The speed control rate determination system or predictive model may be created based on a large set of driving statistics captured from a variety of vehicles driven under a variety of driving conditions, which may be trained using a machine learning system. The vehicle control information may include a current target speed control position (e.g., current target throttle or brake position or percentage), a current speed control position, a previous target speed control position, a current vehicle speed, a previous vehicle speed, and/or a current steering position at the point in time. A speed control position refers to a throttle or brake position in a percentage of their respective maximum throttle or brake value. The vehicle control information may be captured additionally by a variety of sensors of the vehicle at real-time while the vehicle is in motion. The output of the system or predictive model represents a recommended speed control rate (also referred to as a target speed control rate), which may be utilized to generate a speed control command for a subsequent command cycle or cycles. A speed control rate refers to a change rate or change amount of a speed control command (e.g., increment or decrement) in a form of throttle percentage or brake percentage.

In one embodiment, a set of speed control rate candidates is determined, which represents the possible speed control rates for a particular autonomous vehicle or particular type of autonomous vehicles. The set of speed control rate candidates may be predetermined and they may vary from vehicles to vehicles. For each of the speed control rate candidates, one or more individual costs are calculated for the speed control rate candidate using one or more cost functions. Each cost function corresponds to one of the cost categories to be taken into consideration when determining a target speed control rate for one or more subsequent command cycles. A total cost is calculated based on the individual costs for each speed control rate candidate. After all of the total costs of all speed control rate candidates have been determined, one of the speed control rate candidates having the lowest total cost is selected as the actual target speed control rate for the subsequent command cycle or cycles.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
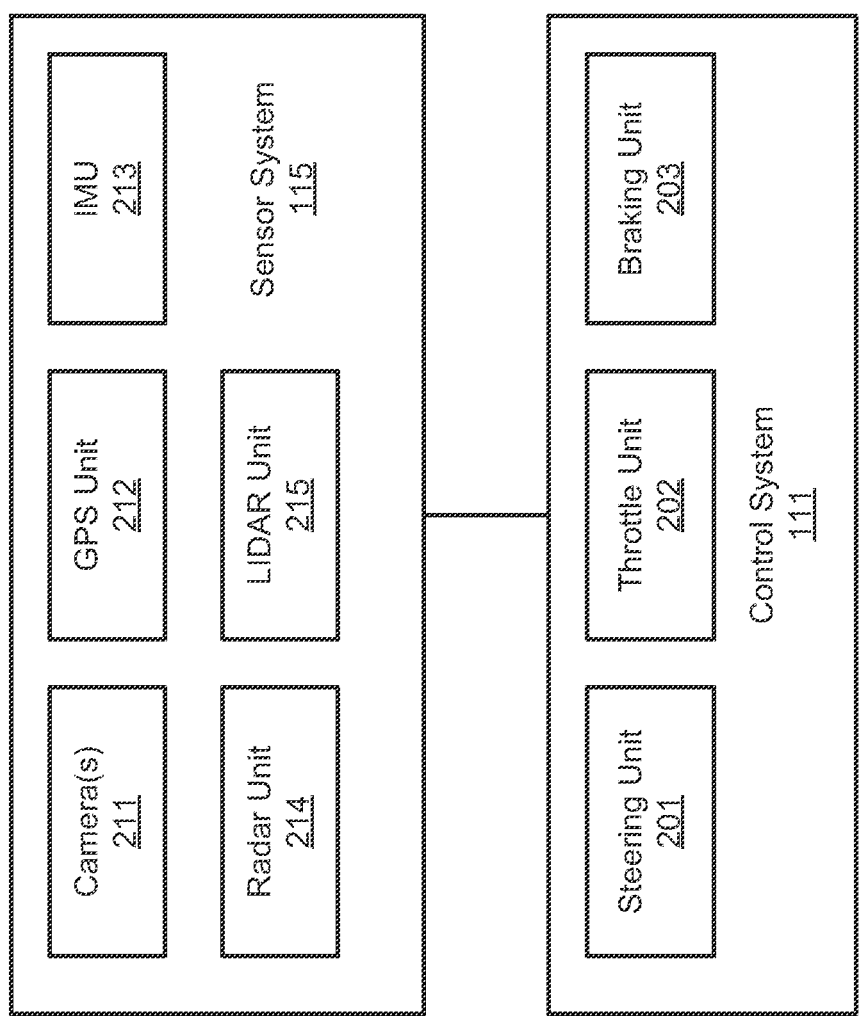
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of algorithms or predictive models 124 for a variety of purposes. In one embodiment, machine learning engine 122 generates a set of one or more cost functions or cost predictive models 124 to determine or predict a cost for a particular speed control rate to be targeted. Cost functions 124 may include one or more individual cost functions to calculate one or more individual costs of one or more cost category. Cost functions 124 are designed to calculate individual costs for targeting a specific speed control rate.

In one embodiment, cost functions 124 include a first cost function to determine a first cost based on a target speed control position (e.g., throttle position) and a current speed control position. Cost functions 124 may further include a second cost function to determine a second cost based on a past target vehicle speed and a past vehicle speed in a previous command cycle. Cost functions 124 may further include a third cost function to determine a third cost based on the current vehicle speed. Cost functions 124 may further include a fourth cost function to determine a fourth cost based on a target speed control rate. Cost functions 124 may further include a fifth cost function to determine a fifth cost based on a current steering position of the vehicle.

In one embodiment, cost functions 124 may be determined and created by machine learning engine 122 based on driving statistics 123, which were collected from a variety of vehicles. Machine learning engine 122 may examine the driving statistics of autonomous driving and compare those with the driving statistics of the vehicles driven by human drivers under the same or similar driving circumstances. The difference between the autonomous driving and the human driving may determine the cost for the driving parameters, in this example, speed control rates, in order to achieve the same or similar results as of human drivers. In one embodiment, if the difference between autonomous driving and human driving is small, the cost may be lower, or vice versa. Once the cost functions 124 have been created, they can be uploaded to autonomous vehicles to be used to dynamically adjust the speed control rates as planned at real-time, such that the acceleration or deceleration of the vehicles can be more comfortable and smooth.

Figure 3:
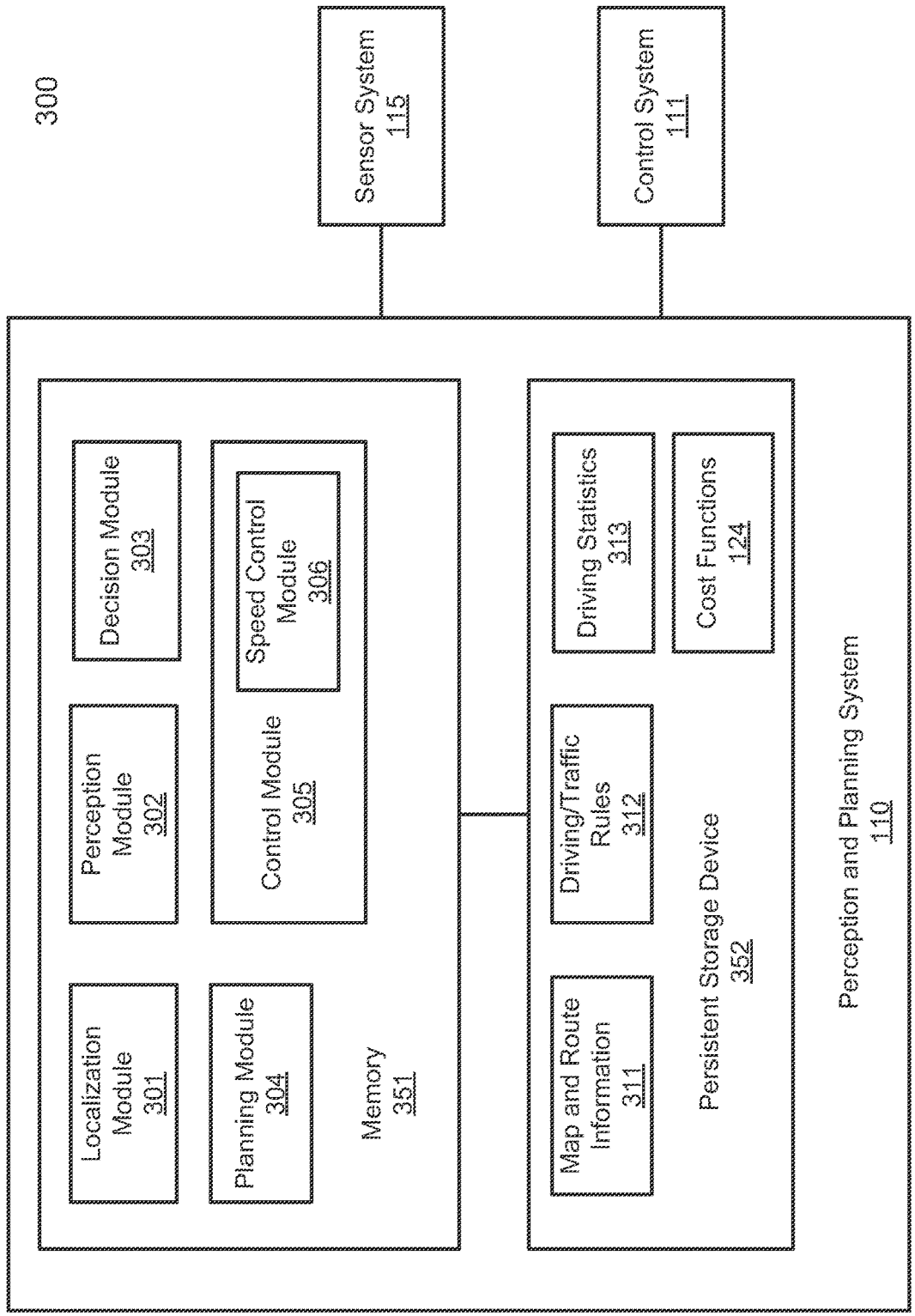
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as driving or traffic rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, control module 305 includes speed control module 306 to control the speed of the vehicle. In response to a request to change a speed of the vehicle, which may be planned by planning module 304, speed control module 306 determines a set of one or more speed control rate candidates as the potential target speed control rates. The speed control rate candidates may be previously determined for the vehicle or the type of vehicles and stored in persistent storage device 352. For each of the speed control rate candidates, speed control module 306 determines a cost of issuing a speed control command based on the speed control rate candidate as a potential target speed control rate using one or more of cost functions 124. Speed control module 306 then selects one of the speed control rate candidates having the lowest total cost as the target speed control rate for a subsequent command cycle.

A cost associated with a speed control rate candidate represents a difficulty or dangerous level at which the vehicle is able to accelerate or decelerate as planned under the circumstances. A high cost indicates that the vehicle may have a higher difficulty level to achieve the goal of acceleration or deceleration based on the speed control rate candidate in question. Alternatively, the cost represents a comfort level at which a passenger is when the vehicle accelerates or decelerates according to the speed control rate candidate in question under the circumstances. A lower cost indicates that the passenger may feel more comfortable when the vehicle accelerates or decelerates according to the speed control rate candidate in question.

Figure 4:
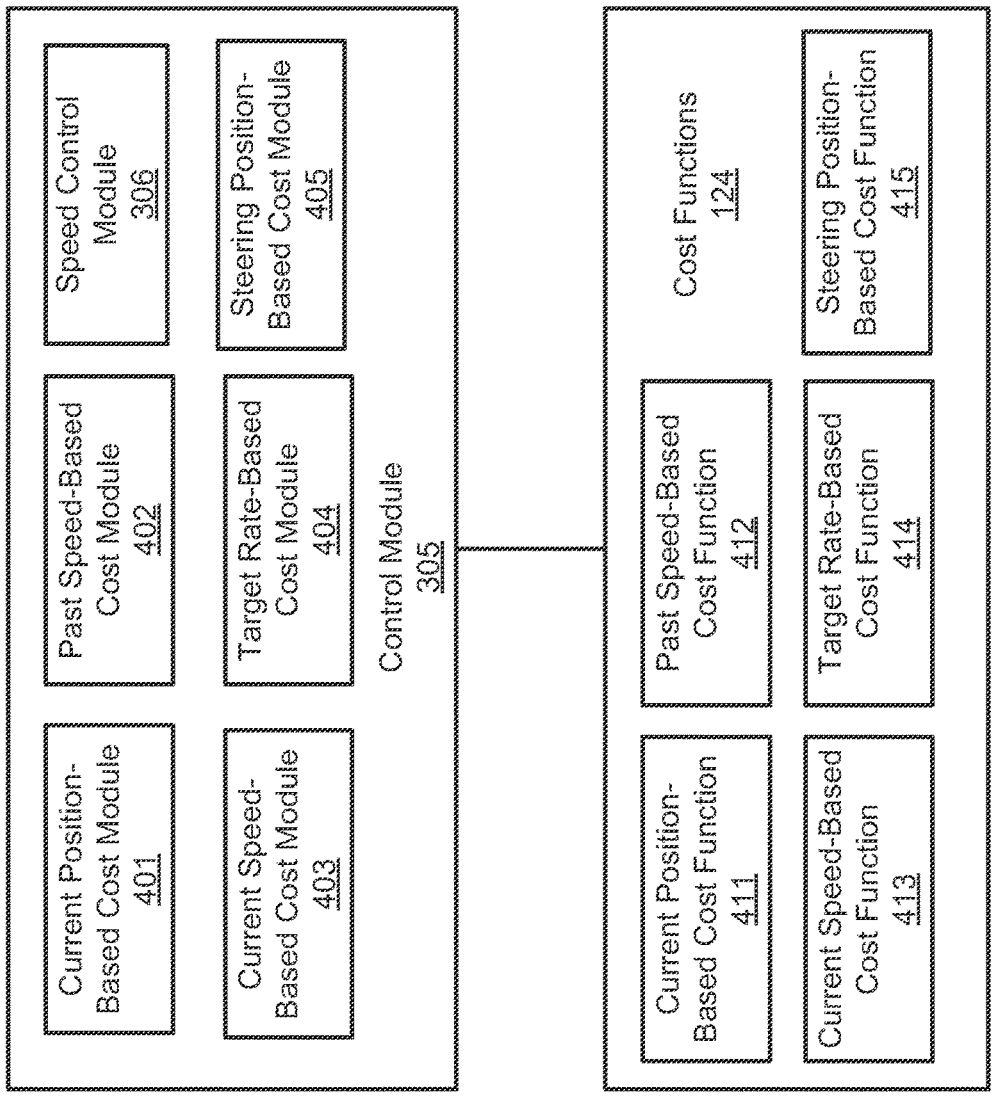
FIG. 4 is a block diagram illustrating a control module according to one embodiment of the invention.

FIG. 4 is a block diagram illustrating a control module according to one embodiment of the invention. Referring to FIG. 4, control module 305 includes a speed control module 306, current position-based cost module 401, past speed-based cost module 402, current speed-based cost module 403, target rate-based cost module 404, and steering position-based cost module 405. Each of cost modules 401-405 calculates an individual cost of a particular cost category using a corresponding one of cost functions 124, such as, current position-based cost function 411, past speed-based cost function 412, current speed-based cost function 413, target rate-based cost function 414, and steering position-based cost function 415. Cost functions 411-415 may be created based on prior driving statistics by a machine learning engine such as machine learning engine 122 of FIG. 1. Although there are only five cost functions representing five different cost categories, more or fewer cost functions can also be utilized.

In one embodiment, in response to a request to determine a speed control rate, a set of one or more speed control rate candidates is determined or selected. For each of the speed control rate candidates, speed control module 306 invokes one or more of cost modules 401-405 to calculate one or more individual costs for their respective cost categories using one or more cost functions 411-415. A total cost for the speed control rate candidate is then calculated based on the individual costs generated by the cost modules 401-405 using at least some of cost functions 411-415. One of the speed control rate candidates having the lowest total cost is selected as a target speed control rate for a subsequent command cycle. A speed control position refers to a throttle or brake position in percentage of their respective maximum throttle or brake value. A speed control rate refers to a change amount of a speed control position (e.g., throttle or brake position or percentage). For example, if a throttle position is changed from 35% to 50%, the throttle rate will be an increment of 15%.

In one embodiment, current position-based cost function 411 is used by current position-based cost module 401 to calculate a cost based on a current speed control position (e.g., throttle or brake position) and a target speed control position in view of the speed control rate candidate in question representing a potential target speed control rate. In one embodiment, cost function 411 is used to calculate a cost based on a difference between the current speed control position and the target speed control position in view of the target speed control rate in question. In one embodiment, if the target speed control rate is greater than or equals to the difference between the current speed control position and the target speed control position, the cost is assigned as zero. Otherwise, if the target speed control rate is less than the difference between the current speed control position and the target speed control position, the cost is assigned with the difference between the current speed control position and the target speed control position minus the target speed control rate (e.g. speed control rate candidate in question) as follows:

$$\text{Cost} = \text{Diff(target position, current position)} - \text{Target Speed Control Rate}$$

Referring now to FIG. 5, which is a data structure illustrating costs calculated using different cost functions for a set of speed control rate candidates 501, costs 502 are then calculated for the speed control rate candidates 501. In this example, it is assumed the difference between the current speed control position and the target speed control position in a current command cycle is 50. Thus, for speed control rate candidate of 30 as a potential target speed control rate, based on the current position-based cost function 411 as described above, since the difference of 50 is greater than the potential target speed control rate of 30, therefore the cost will be 20 (i.e., the difference of 50 subtracts the target speed control rate of 20). Similarly, the cost for speed control rate candidates of 60 and 80 will be 0, since the speed control rate candidates are greater than or equal to the difference of 50.

According to one embodiment, past speed-based cost function 412 is used by past speed-based cost module 402 to calculate a cost based on the previous target speed and the previous actual speed ended up in a previous command cycle, i.e., the difference between the "current" speed and the target speed of the previous command cycle. In one embodiment, a previous command cycle refers to the last command cycle immediately before the current command cycle. In one embodiment, for a given speed control rate candidate, the past speed-based cost 503 is calculated as follows:

$$\text{Cost} = \text{Diff(Past Target Speed, Past Actual Speed)} \times 100/\text{Speed Control Rate Candidate}$$

Difference (diff) herein refers to the difference between a target vehicle speed and the actual vehicle speed ended up in a previous command cycle.

Referring to FIG. 5, in this example, it is assumed the difference between the past target speed and the past actual speed is 5. For speed control rate of 30, the cost will be 5*100/30=16.67. The cost for the remaining speed control rate candidates of 60 and 80 can also be calculated using the above algorithm as of 8.3 and 6.25.

According to one embodiment, the current speed-based cost 504 may be calculated by current speed-based cost module 403 (e.g., current speed-based cost function 413) based on the current vehicle speed in view of the current speed control rate candidate. In one embodiment, cost 504 may be determined based on a difference between the current vehicle speed and the speed control rate candidate in question. In a particular embodiment, if the speed control rate candidate is larger than or equal to the current speed, cost 504 will be assigned with the difference; otherwise, the cost will be assigned with a predetermined value, in this example as shown in FIG. 5, zero. Therefore, cost 504 for speed control rate candidate of 30 will be zero since the vehicle speed is larger than the speed control rate candidate. Cost 504 for speed control rate candidates of 60 and 80 will be their respective differences, i.e., 10 and 30.

According to one embodiment, the target rate-based cost 505 can be calculated by target rate-based cost module 404 using target rate-based cost function 414, such as a linear cost function. The rationale behind it is that the cost is proportional to the target speed control rate: as higher speed control rate costs more. For simplicity, in one embodiment, the cost for a given speed control rate candidate, the target rate-based cost 505 equals to the speed control rate candidate itself as 30, 60, and 80 as shown in FIG. 5.

According to one embodiment, steering position-based cost 505 can be calculated by steering position-based cost module 405 using steering position-based cost function 415 based on a current steering position (in degrees) and the target speed control rate candidate. In one embodiment, cost 505 may be determined based on a difference between the current steering position and the speed control rate candidate in question. The rationale behind it is that if the steering position is high, the cost to accelerate or decelerate will be higher since the vehicle is turning. It will be more dangerous or uncomfortable for higher acceleration or deceleration if the vehicle is turning sharper. In a particular embodiment, if the speed control rate candidate is larger than or equal to the current steering position, cost 505 will be assigned with the difference; otherwise, the cost will be assigned with a predetermined value, in this example as shown in FIG. 5, zero. Therefore, assuming the current steering position is 40, cost 505 for speed control rate candidate of 30 will be zero since the steering position is larger than the speed control rate candidate. Cost 505 for speed control rate candidates of 60 and 80 will be their respective differences, i.e., 10 and 40.

After all individual costs 502-505 have been calculated for each of the speed control rate candidates 501, total cost 506 for each of the speed control rate candidates 501 is calculated, for example, by summing individual costs 502-505. One of the speed control rate candidates 501 having the lowest total cost (in this example, candidate of 100) is then selected as the target speed control rate for a subsequent command cycle for speed control.

Figure 6:
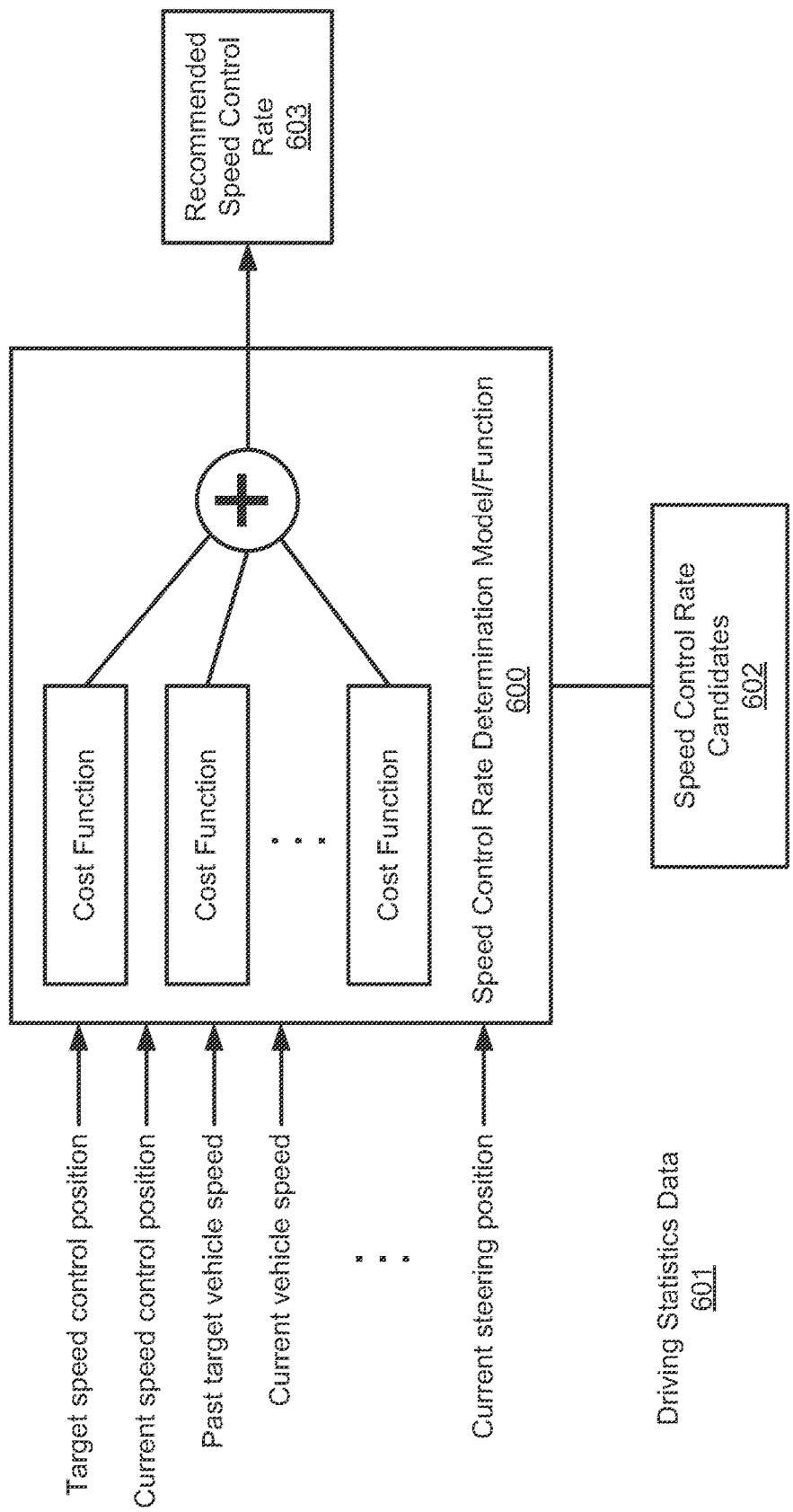
FIG. 6 shows an example of a speed control rate determination model according to one embodiment of the invention.

Note that the table as shown in FIG. 5 is utilized to demonstrate a process for determining a throttle rate. The same or similar techniques can also be utilized to determine a braking rate. Also note that the above techniques can be implemented in a variety of ways. In one embodiment, the cost calculation and/or the selection of a speed control rate candidate may be performed by a speed control rate model or function as shown in FIG. 6. Referring to FIG. 6, speed control rate determination model 600 may be created and trained by a machine learning engine such as machine learning engine 122 of data analytics system 103. Model 600 may be trained based on a large amount of driving statistics 123 offline.

At real-time or online when the vehicle is being operated, a set of driving statistics 601 is captured and fed into model 600 in view of a set of speed control rate candidates 602, which can be throttle or braking rate candidates. Model 600 may perform at least some of the above operations to determine and select one of the speed control rate candidates 602 as a target speed control rate 603 for generating a speed control command of a next command cycle. A command cycle refers to a period of time or frequency during which a control command will be generated and issue to the vehicle hardware. For example, if a control command will be issued for every 0.1 second, the time period of 0.1 second is referred to as a command cycle.

Figure 7:
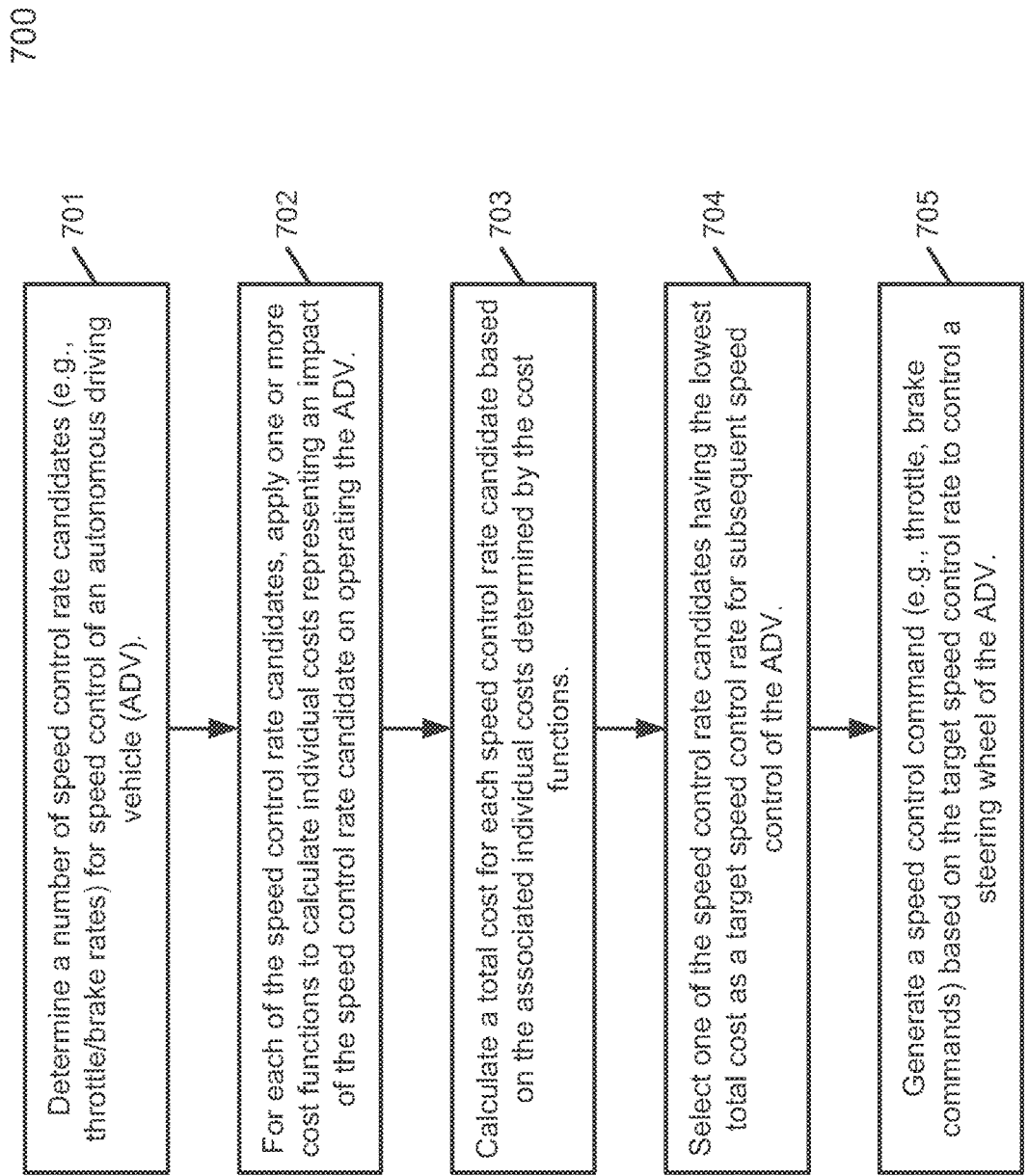
FIG. 7 is a flow diagram illustrating a process of a determining speed control rate for operating an autonomous vehicle according to one embodiment of the invention.

FIG. 7 is a flow diagram illustrating a process of a determining speed control rate for operating an autonomous vehicle according to one embodiment of the invention. Process 700 may be performed by processing logic which may include software, hardware, or a combination thereof. For example, process 700 may be performed by control module 305. Referring to FIG. 7, in operation 701, processing logic determines a number of speed control rate candidates for speed control of an ADV (e.g., acceleration, deceleration, or maintaining a constant speed). For each of the speed control rate candidates (e.g., throttle rate or brake rate), in operation 702, processing logic applies one or more cost functions to calculate one or more individual costs representing an impact of the speed control rate candidate to operate the ADV. Each cost functions corresponds to one of the cost categories (e.g., current position-based, past speed-based, current speed-based, target rate-based, and steering position-based categories). In operation 703, a total cost is determined based on the individual costs for each of the speed control rate candidates. In operation 704, one of the speed control rate candidates having the lowest total cost is selected as a target speed control rate for a subsequent command cycle for speed control of the ADV. In operation 705, a speed control command is generated based on the target speed control rate to control a speed of the ADV.

Figure 8:
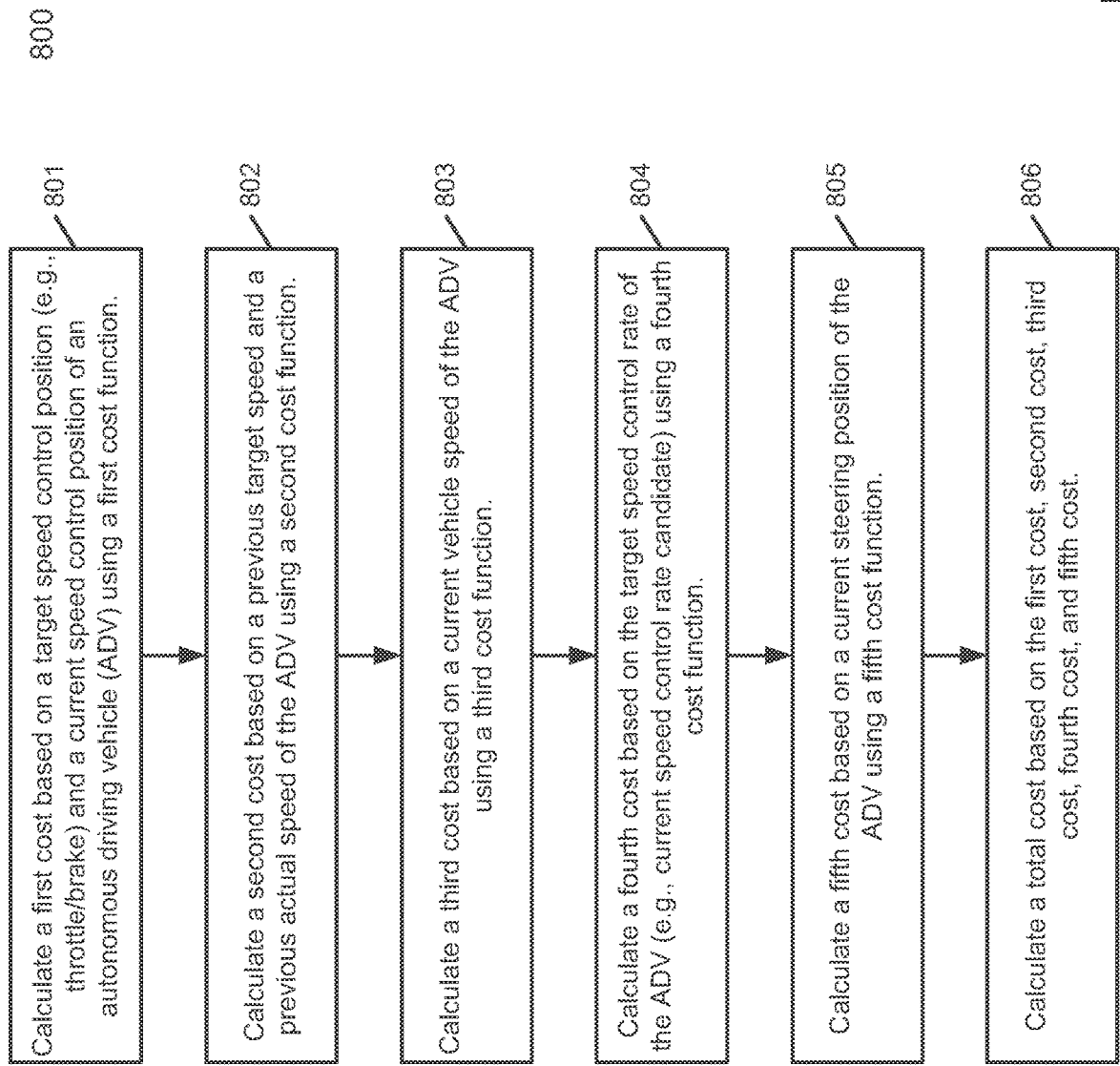
FIG. 8 is a flow diagram illustrating a process of a determining speed control rate for operating an autonomous vehicle according to another embodiment of the invention.

FIG. 8 is a flow diagram illustrating a process of a determining speed control rate for operating an autonomous vehicle according to another embodiment of the invention. Process 800 may be performed by processing logic which may include software, hardware, or a combination thereof. For example, process 800 may be performed by control module 305 as part of operations 702-703 of FIG. 7. Referring to FIG. 8, in operation 801, processing logic calculates a first cost based on a target speed control position and a current speed control position (of the current command cycle) using a first cost function (e.g., current position-based cost function 411). If the difference between the target and current speed control positions is less than the target speed control rate (e.g., current speed control rate candidate in question), the first cost is zero; otherwise, the first cost equals to the difference between the target and current speed control positions.

In operation 802, processing logic calculates a second cost based on a past target speed and a past actual speed ended up of a previous command cycle using a second cost function (e.g., past speed-based cost function 412). In operation 803, processing logic calculates a third cost based on a current vehicle speed of the ADV using a third cost function (e.g., current speed-based cost function 413). In operation 804, processing logic calculates a fourth cost based on the target speed control rate (e.g., speed control rate candidate in question) using a fourth cost function (e.g., target rate-based cost function 414). In operation 805, processing logic calculates a fifth cost based on a current steering position of the ADV using a fifth cost function (e.g., steering position-based cost function 415). In operation 806, a total cost is calculated based on the first cost, the second cost, the third cost, the fourth cost, and the fifth cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
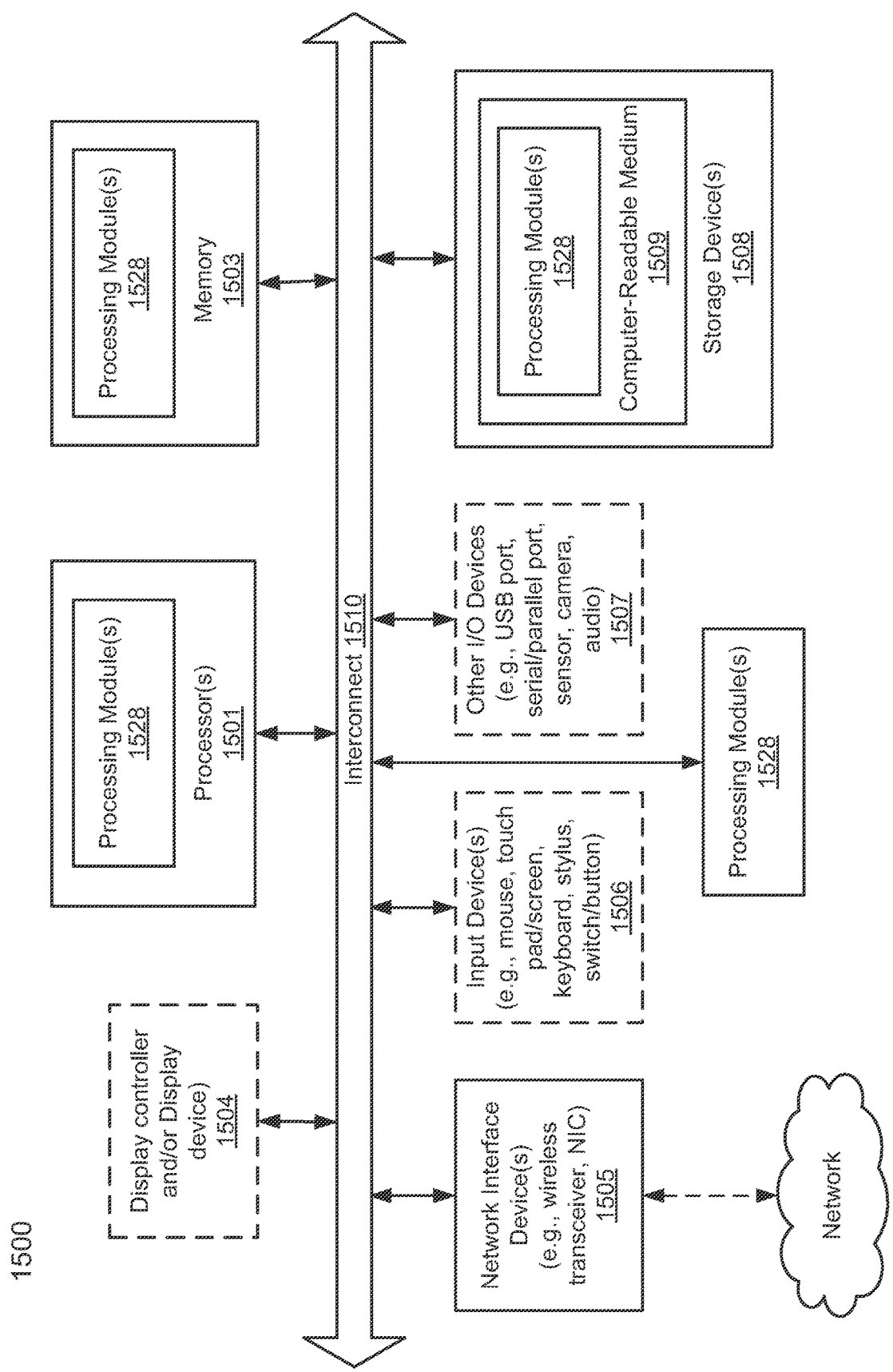
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
    determining a plurality of speed control position change amount candidates for a speed control command of operating an autonomous vehicle, the plurality of speed control position change amount candidates including a plurality of throttle or brake position change amount candidates, each throttle or brake position change amount candidate including a candidate of a change amount of a throttle or brake position in percentage of a respective maximum throttle or brake value;
    for each of the speed control position change amount candidates including the throttle or brake position change amount candidates,
        calculating a plurality of individual costs for the throttle or brake position change amount candidate by applying a plurality of cost functions, each cost function corresponding to one of a plurality of cost categories, wherein calculating an individual cost for the throttle or brake position change amount candidate comprises
            calculating a first individual cost based on a difference between a target throttle or brake position in percentage of the respective maximum throttle or brake value and a current throttle or brake position in percentage of the respective maximum throttle or brake value of the autonomous vehicle using a first cost function, and
            assigning the first individual cost as the difference between the target throttle or brake position and the current throttle or brake position minus the throttle or brake position change amount candidate in response to that the throttle or brake position change amount candidate is less than the difference, and
        calculating a total cost for the throttle or brake position change amount candidate based on the individual costs produced by the cost functions;
    selecting one of the speed control position change amount candidates having a lowest total cost as a target speed control position change amount; and
    generating a speed control command based on the selected speed control position change amount candidate for a subsequent command cycle to control a speed of the autonomous vehicle; and
    controlling the throttle or brake of the autonomous vehicle to drive autonomously according to the speed control command based on the selected speed control position change amount candidate for the subsequent command cycle.

2. The method of claim 1, wherein calculating an individual cost for the speed control position change amount candidate comprises calculating a fourth individual cost based on the speed control position change amount candidate as a target speed control position change amount using a fourth cost function.

3. The method of claim 1, further comprising:
    assigning the first individual cost as a predetermined value in response to that the throttle or brake position change amount candidate is greater than or equal to the difference.

4. The method of claim 1, wherein calculating an individual cost for the speed control position change amount candidate comprises calculating a second individual cost based on a difference between a previous target speed and an actual speed of the autonomous vehicle for a previous command cycle using a second cost function.

5. The method of claim 4, wherein the second individual cost is calculated based on a difference between the speed control position change amount candidate and a highest speed control position change amount candidate in view of the difference between the previous target speed and the actual speed of the autonomous vehicle.

6. The method of claim 1, wherein calculating an individual cost for the speed control position change amount candidate comprises calculating a third individual cost based on a current vehicle speed of the autonomous vehicle in view of the speed control position change amount candidate as a target speed control position change amount using a third cost function.

7. The method of claim 6, further comprising:
assigning the third individual cost as a difference between the current vehicle speed and the speed control position change amount candidate, if the speed control position change amount candidate is greater than or equal to the current vehicle speed; and
assigning the third individual cost as a predetermined value, if the speed control position change amount candidate is less than the current vehicle speed.

8. The method of claim 1, wherein calculating an individual cost for the speed control position change amount candidate comprises calculating a fifth individual cost based on a current steering position of the autonomous vehicle in view of the speed control position change amount candidate.

9. The method of claim 8, further comprising:
assigning the fifth individual cost as a difference between the steering position and the speed control position change amount candidate, if the speed control position change amount candidate is greater than or equal to the steering position; and
assigning the fifth individual cost as a predetermined value, if the speed control position change amount candidate is less than the steering position.

10. A non-transitory machine-readable medium having instructions stored therein, which when executed by a processor, cause the processor to perform operations, the operations comprising:
determining a plurality of speed control position change amount candidates for a speed control command of operating an autonomous vehicle, the plurality of speed control position change amount candidates including a plurality of throttle or brake position change amount candidates, each throttle or brake position change amount candidate including a candidate of a change amount of a throttle or brake position in percentage of a respective maximum throttle or brake value;
for each of the speed control position change amount candidates including the throttle or brake position change amount candidates,
calculating a plurality of individual costs for the throttle or brake position change amount candidate by applying a plurality of cost functions, each cost function corresponding to one of a plurality of cost categories, wherein calculating an individual cost for the throttle or brake position change amount candidate comprises
calculating a first individual cost based on a difference between a target throttle or brake position in percentage of the respective maximum throttle or brake value and a current throttle or brake position in percentage of the respective maximum throttle or brake value of the autonomous vehicle using a first cost function, and
assigning the first individual cost as the difference between the target throttle or brake position and the current throttle or brake position minus the throttle or brake position change amount candidate in response to that the throttle or brake position change amount candidate is less than the difference, and
calculating a total cost for the throttle or brake position change amount candidate based on the individual costs produced by the cost functions;
selecting one of the speed control position change amount candidates having a lowest total cost as a target speed control position change amount;
generating a speed control command based on the selected speed control position change amount candidate for a subsequent command cycle to control a speed of the autonomous vehicle; and
controlling the throttle or brake of the autonomous vehicle to drive autonomously according to the speed control command based on the selected speed control position change amount candidate for the subsequent command cycle.

11. The machine-readable medium of claim 10, wherein calculating an individual cost for the speed control position change amount candidate comprises calculating a fifth individual cost based on a current steering position of the autonomous vehicle in view of the speed control position change amount candidate.

12. The machine-readable medium of claim 11, wherein the operations further comprise:
assigning the fifth individual cost as a difference between the steering position and the speed control position change amount candidate, if the speed control position change amount candidate is greater than or equal to the steering position; and
assigning the fifth individual cost as a predetermined value, if the speed control position change amount candidate is less than the steering position.

13. The machine-readable medium of claim 10, wherein the operations further comprise:
assigning the first individual cost as a predetermined value in response to that the throttle or brake position change amount candidate is greater than or equal to the difference.

14. The machine-readable medium of claim 10, wherein calculating an individual cost for the speed control position change amount candidate comprises calculating a second individual cost based on a difference between a previous target speed and an actual speed of the autonomous vehicle for a previous command cycle using a second cost function.

15. The machine-readable medium of claim 14, wherein the second individual cost is calculated based on a difference between the speed control position change amount candidate and a highest speed control position change amount candidate in view of the difference between the previous target speed and the actual speed of the autonomous vehicle.

16. The machine-readable medium of claim 10, wherein calculating an individual cost for the speed control position change amount candidate comprises calculating a third individual cost based on a current vehicle speed of the autonomous vehicle in view of the speed control position change amount candidate as a target speed control position change amount using a third cost function.

17. The machine-readable medium of claim 16, wherein the operations further comprise:
    assigning the third individual cost as a difference between the current vehicle speed and the speed control position change amount candidate, if the speed control position change amount candidate is greater than or equal to the current vehicle speed; and
    assigning the third individual cost as a predetermined value, if the speed control position change amount candidate is less than the current vehicle speed.

18. The machine-readable medium of claim 10, wherein calculating an individual cost for the speed control position change amount candidate comprises calculating a fourth individual cost based on the speed control position change amount candidate as a target speed control position change amount using a fourth cost function.

19. A data processing system, comprising:
    a processor; and
    a memory coupled to the processor to store instructions, which when executed by the processor, cause the processor to perform operations, the operations including
        determining a plurality of speed control position change amount candidates for a speed control command of operating an autonomous vehicle, the plurality of speed control position change amount candidates including a plurality of throttle or brake position change amount candidates, each throttle or brake position change amount candidate including a candidate of a change amount of a throttle or brake position in percentage of a respective maximum throttle or brake value,
        for each of the speed control position change amount candidates including the throttle or brake position change amount candidates,
            calculating a plurality of individual costs for the throttle or brake position change amount candidate by applying a plurality of cost functions, each cost function corresponding to one of a plurality of cost categories, wherein
                calculating an individual cost for the throttle or brake position change amount candidate comprises calculating a first individual cost based on a difference between a target throttle or brake position in percentage of the respective maximum throttle or brake value and a current throttle or brake position in percentage of the respective maximum throttle or brake value of the autonomous vehicle using a first cost function, and
                assigning the first individual cost as the difference between the target throttle or brake position and the current throttle or brake position minus the throttle or brake position change amount candidate in response to that the throttle or brake position change amount candidate is less than the difference, and
            calculating a total cost for the throttle or brake position change amount candidate based on the individual costs produced by the cost functions,
        selecting one of the speed control position change amount candidates having a lowest total cost as a target speed control position change amount, and
        generating a speed control command based on the selected speed control position change amount candidate for a subsequent command cycle to control a speed of the autonomous vehicle; and
        controlling the throttle or brake of the autonomous vehicle to drive autonomously according to the speed control command based on the selected speed control position change amount candidate for the subsequent command cycle.

20. The system of claim 19, wherein the operations further comprise:
    assigning the first individual cost as a predetermined value in response to that the throttle or brake position change amount candidate is greater than or equal to the difference.

* * * * *